United States Patent [19]

Terry et al.

[11] Patent Number: 5,127,078
[45] Date of Patent: Jun. 30, 1992

[54] INTEGRATED DISPLAY FOR IMAGE PRESENTATION AND RECEIVING USING FIBER OPTICS

[75] Inventors: Joyce E. Terry, Big Bear City; Jessie C. Bossett, Riverside, both of Calif.

[73] Assignee: Terry Weed, Fountain Valley, Calif.

[21] Appl. No.: 656,228

[22] Filed: Feb. 13, 1991

[51] Int. Cl.⁵ ............................................. G02B 6/04
[52] U.S. Cl. ................................. 385/116; 385/115
[58] Field of Search ............... 350/96.24, 96.25, 96.15; 385/115, 116, 117, 118, 119, 120, 121

[56] References Cited

U.S. PATENT DOCUMENTS

| | | | |
|---|---|---|---|
| 3,907,403 | 9/1975 | Matsushita | 350/96 B |
| 4,173,391 | 11/1979 | Schure et al. | 385/120 |
| 4,525,711 | 6/1985 | Gery | 340/815.31 |
| 4,571,616 | 2/1986 | Haisma | 358/88 |
| 4,915,486 | 4/1990 | Hansen | 350/171 |
| 4,917,448 | 4/1990 | Oppenheimer | 385/147 X |

*Primary Examiner*—Frank Gonzalez
*Assistant Examiner*—Phan T. Heartney

[57] ABSTRACT

A device for displaying two-dimensional or three-dimensional images in which there is a light receiving system integrated, and unnoticeable, within the display itself through which the light receiving system can enable the image emitting system to display the same image that is being received or sending the image elsewhere, or both. Three devices are described for accomplishing this. The first is a two-dimensional system in which is shown a fiber optic faceplate with about half of the fibers separated and extended from the faceplate. About one half being the light receiving fiber and about the other half being the light emitters for image presentation. The light receiver could be a video camera, photo diode or other form of light receiver. The light emitter could be a diode, CRT or other form of light emitter. Also shown is the use of one and the same individual fiber optic being used to simultaneously receive and transmit an image such that separate fibers are not mandatory for this invention to operate. The second is a three-dimensional system in which is shown a same general system as the two-dimensional system except that multiple light sources are simultaneously being emitted from the same fiber optic pixel at different, non-interfering angles. The third system is the same as the three-dimensional system. The difference is that the multi-shaped display shown can be rendered transparent to varying degrees by displaying the image being received from behind the display.

13 Claims, 10 Drawing Sheets

Figure 2
Light Scattering of
Input & Output Light

Figure 3
Fiber optic circuit board assembly

Figure 6
3-Dimensional Light Source Arrangement

Figure 7-A
3-Dimensional Light Source Arrangement with Input

Figure 7-B
Photo Diode Image Receiving System

Figure 8
Geometrical Arrangement of
Fibers in Faceplate

INTEGRATED DISPLAY FOR IMAGE PRESENTATION AND RECEIVING USING FIBER OPTICS

BACKGROUND—FIELD OF INVENTION

This invention relates to a device for displaying a two-dimensional or three-dimensional image in which there is a image receiving system integrated, and unnoticeable, within the display itself through which the image receiving system can send the image to the displaying system such that the display can present the same image it is receiving or it can send the image elsewhere or it can display a different image or any combination there of.

BACKGROUND-DESCRIPTION OF PRIOR ART

Heretofore, a similar device is disclosed in U.S. Pat. No. 4,571,616 to Haisma, Feb. 18, 1986, in which a series of lenses in front of a fiber optic plate are used to display an unambiguous stereoscopic image. This prior art shows two or more view points of the same image as seen from two or more video cameras. Each video camera corresponds to a specific set of respective fiber optic bundles. Each set of fiber optic light conductors transfers it's video camera image to a specific lens on the display. If there are three cameras being used, then each lens on the display will have three separate sets of fiber optic bundles arranged behind it. This system then projects a three-dimensional image.

However, the bulging lens elements on the front of the screen can be distracting to the viewer. Traditionally, viewers are used to cathode ray tubes of bright and consistent intensity on flat screens. Also, in the known device, the image input for the cameras is a separate entity from the display thereby not allowing for eye-to-eye contact in the display when viewing another person.

Another prior art is disclosed in U.S. Pat. No. 4,915,486 to Hansen, Apr. 10, 1990, in which a display panel for image presentation and/or recording is described using fiber optics. This design however, must alternatively, not simultaneously present and/or record an image. Shown in this patent are fiber optic light guides arranged in a longitudinal matrix with small notches or crystals placed in precise locations on the surface of longitudinal direction of the fibers. With light sources and light receivers placed transversely to the fiber, LCD light valves located over the notches or crystals are then used to alternatively open and close thus releasing and alternatively receiving light into the respective fiber.

This design does not allow for a continuous, simultaneous display and recording of an image nor does it allow for stereoscopic (three-dimensional) viewing and recording. Furthermore, it calls for a difficult manufacturing procedure of precisely aligning and placing notches or crystals along the fiber's length.

The more well-known and traditional forms of image displays such as CRT's, LCD picture panels, Gas plasma displays, vacuum florescent elements and standard light emitting diodes and deformable mirrors all have the same deficiencies. First, they are all currently striving for greater display definition in that they are all trying to break the 1 million pixel barrier for a fourteen inch display screen. To date, they have been unsuccessful. Second, none of the display panel techniques hitherto known makes it possible by means of one and the same unit both to present pictures and to simultaneously and continuously pick up images on the same display panel in real-time with virtually no noticeable delay time.

The present invention overcomes these deficiencies by providing for a two-dimensional, as well as a three-dimensional images which can be viewed on the display screen at a high definitions with pixel densities up to and exceeding one billion pixels in a fourteen inch or other size displays. Furthermore, the present invention provides for one and the same display unit to present real-time simultaneous and continuous recording of an images which can be displayed on the same display or elsewhere on another display or displays.

OBJECTS AND ADVANTAGES

Accordingly, several objects and advantages of the present invention are:

a) to provide eye-to-eye contact during a video-conference type of situation or during a similar situation in which a one-on-one electronic visual communication is taking place between two or more people. This is an advantage over existing techniques in which the camera lens system is not integrated into the display and during such teleconferencing and similar situations, the users are usually looking at the side of each others faces on the displays instead of normal eye-to-eye contact. This occurs because the video camera is beside the display instead of integrated into it. There are many other uses for the present invention such as a teleprompter used by television newscasters in which the newscasters, in addition to looking eye-to-eye at someone in the display, can also look at their script in the display without looking away from the camera. Again, higher definition with real time recording provides for an advantage over known technologies.

b) to provide the same as "a" above except in a higher definition display over existing technologies. Where existing technologies are trying to approach 1 million pixels in a fourteen inch screen, the present technology will allow for up to and exceeding 1 billion pixels in a fourteen inch or other size displays. This higher definition does not, however allow for an advantage over known prior art regarding fiber optic displays however the present invention does allow to provide for a less expensive method of manufacturing a fiber optic display that is not as susceptible to temperature effects associated with the expansion coefficients of the arrays such as in the prior art. Therefore the advantage here is that the present invention can effectively provide for a higher definition display that can both present and receive image simultaneously.

c) to provide the same as "a" and "b" above except in a three-dimensional stereoscopic presentation, again with a greater degree of definition over prior art.

d) to provide the same as "a" and "b" above except in a holographic presentation again with a greater degree of definition over prior art.

e) to provide the first true electronic mirror to be used with a variety of special effects for the user. With the proper computer software in place, such a system can be used for plastic surgeons to display future physical changes proposed by the plastic surgeon to his patient in a real-time mode. The Cosmetic industry can also use this technique to display real-time proposed changes to their clients. Many other uses can be used by the electronic mirror as well such as providing for television personalities with instant visual feedback on their appearance without looking away from the camera and many more.

No known prior art exists for this technique.

f) to provide for a means of electronically rendering a display transparent to varying degrees. This is an advantage over the existing prior art displays in that it can provide for a much more dramatic presentation of figures in the display that are not rendered transparent such as computer generated images. An example of an object of this invention is to replace rectangular glass displays that architects use to house small plastic models of proposed buildings, or commercial facilities. This invention would provide a much more dramatic representation of the model, one which could have computer animation that would greatly increase it's effect. Essentially, there is no prior art that can electronically render a display transparent to varying degrees.

DESCRIPTION OF DRAWINGS

FIG. 7-A shows a three-dimensional/holographic output presentation arrangement using individual light sources, such as diodes, for each individual wave guide.

FIG. 7-B shows a three-dimensional/holographic input receiving arrangement using individual light receivers, such as diodes, for each individual wave guide.

DESCRIPTION OF THE INVENTION

Figure 1:
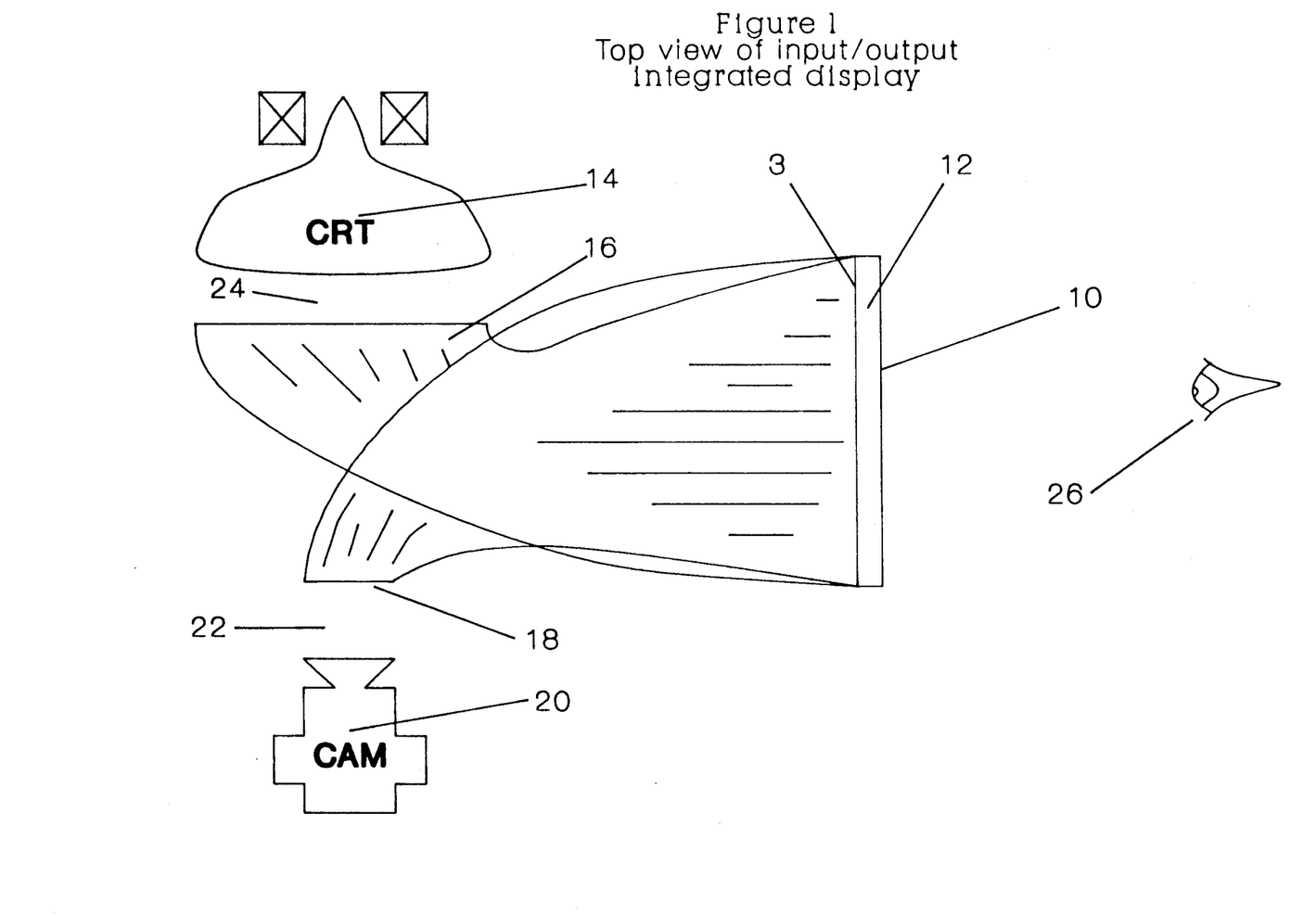
FIG. 1 shows a two-dimensional design of the present invention using a CRT and a video camera.

A typical embodiment of the present invention is illustrated in FIG. 1, which is a top view and is without an enclosure. The display/input screen 10 is shown as a plurality of fiber optic light guides all set in a coherent array which is situated behind a light scattering material 12. The fiber optic array can consist of fiber optic light guides with diameters ranging in size such as fifty micron diameters if high definition is not required or with eight micron diameters if a higher definition is desired. This invention is not limited to these diameters, any available diameter fiber optic wave guides can be used. In this shown FIG. 1, the number of fiber optic pixels required need only be twice as many as the corresponding Cathode Ray Tube 14 shown in order to transmit the image displayed by the CRT 14 to the display/input screen 10 with the same apparent definition as the CRT 14.

Placed directly in front of the CRT is the fiber optic output array 16 that consists of a plurality of coherent fiberoptics making up a faceplate which is a method that is described in a variety of patents and is a well known prior art. This coherent fiber optic output array is then interlaced with the coherent fiber optic input array 18 at the back plane of the light scattering material 12.

Located directly in front the fiber optic input array 18, which comprises a face plate, is a video camera or other type of image input device 20. The distance 22 between the camera 20 and the fiber optic input array 18 is not to scale, nor is the distance 24 between the CRT 14 and the fiber optic output array 16.

Figure 2:
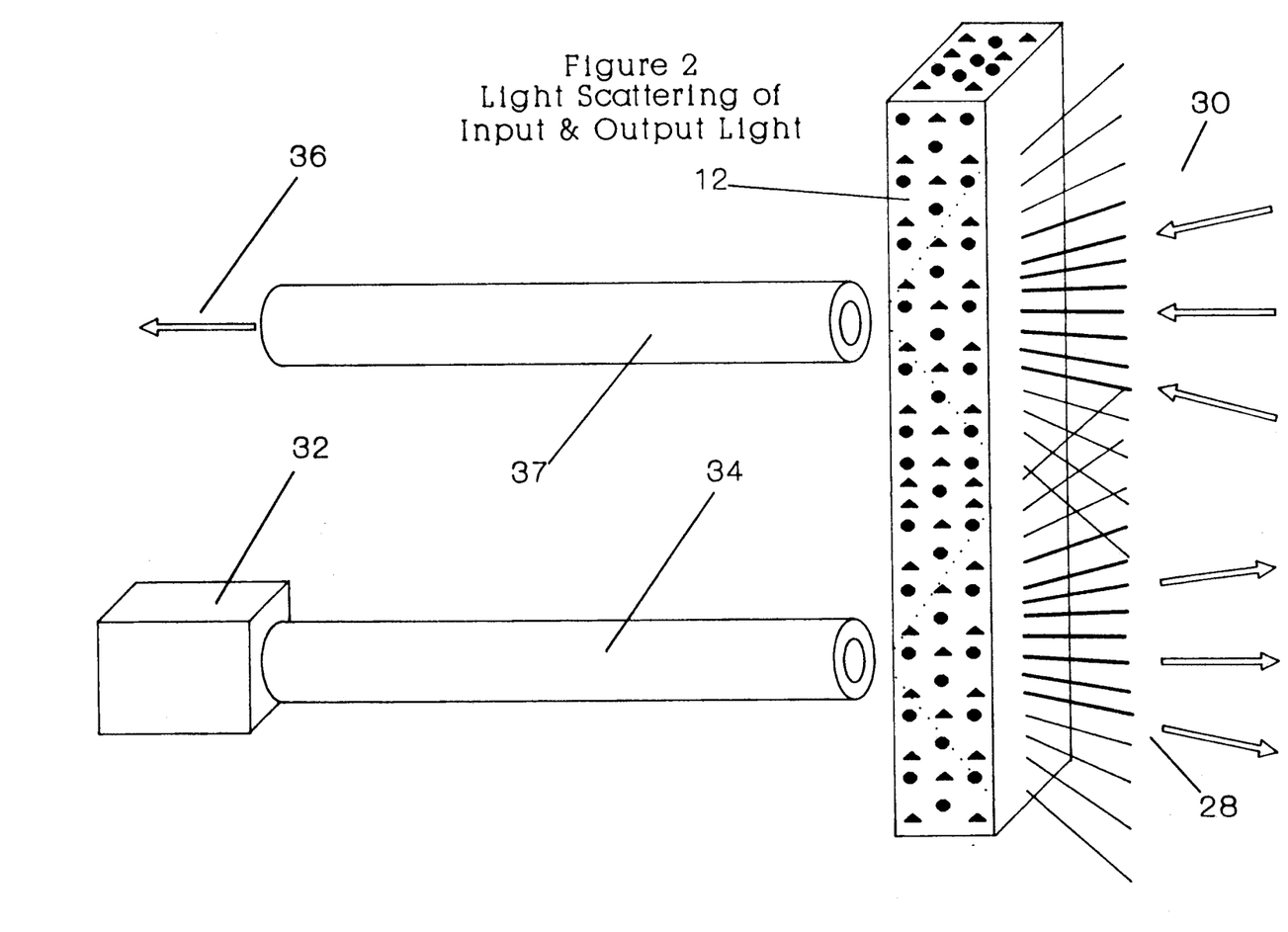
FIG. 2 shows what happens to the light being emitted from its respective fiber optic light guide when it enters a light scattering substance.

FIG. 2 shows a close up of the light scattering material 12 as shown in FIG. 1, item 12. FIG. 2 also shows the effect the scattering material 12 will have on the emitted light 28. Both input fibers 37 and output fibers 34 show light being emitted 28 and light received 30 respectfully.

FIG. 2 also shows a laser diode assembly 32, a known technology, being used as a light source. A colimating lens, inside the laser diode assembly, is used to direct the light in a parallel fashion down the output fiber 34 such that it reaches the substrate material 12 and scatters 28 in a non-linear array. 36 shows the path through the input fiber optic which then exits out to a camera or a light detector located elsewhere.

Figure 3:
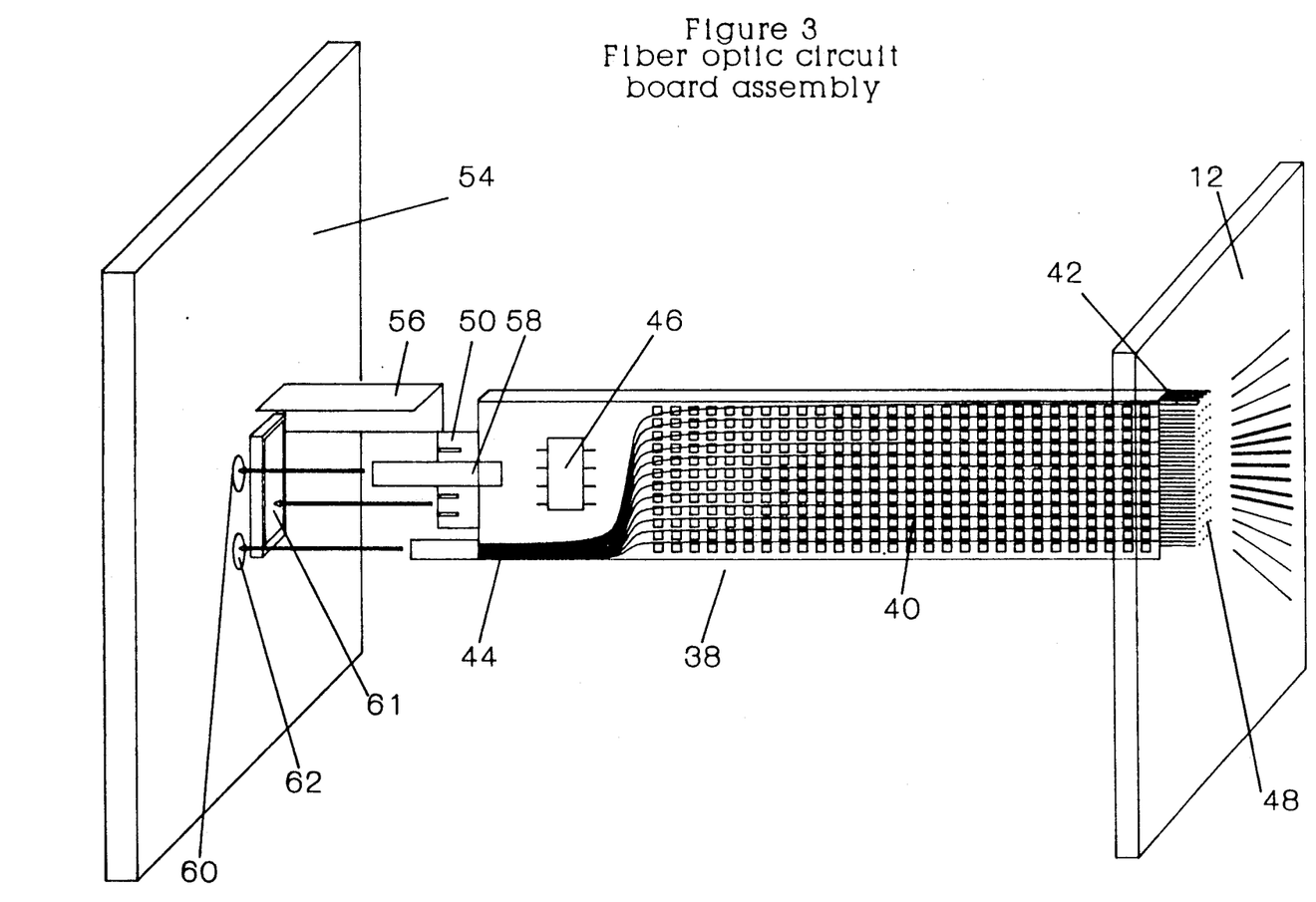
FIG. 3 shows a fiber optic circuit board assembly.

An entire multitude of such laser diodes can serve as a substitute for the CRT shown in FIG. 1. This is illustrated in FIG. 3, in which a fiber optic circuit board assembly 38, referred to as a module, has attached to it a multitude of laser diodes 40 and their corresponding fiber optic output array 42. It is important to note here that this invention is not limited to laser diode light sources but it could use any light source of known technologies. Such light source technologies that could be used on the shown module could be as those previously mentioned such as standard typical diodes, not necessarily laser diodes, LCD picture panels, gas plasma light sources, vacuum florescent elements, deformable mirror light sources and the like.

It is important to point out in this drawing that the fiber optic bundle 44 leading from the face plate, should be coherent but does not have to be providing the necessary test fixture is fabricated that can tell the microprocessor 46 on the module board, which light source corresponds to which specific pixel position on the module face plate 48. The module's microprocessor 46 is connected to the light sources via known technologies. The module is placed behind a light scattering material 12 if scattering is needed. Some light sources may not require scattering, therefore in some instances this covering plate may not be needed.

On the back of the module is the male electrical connector 50 that plugs into the female electrical connector 61 on the back plane mother circuit board 54. Alignment brackets 56 are used to assure proper spacing among the many modules used in the display. Push-pull handles 58 are used for easy installation and removal in case of a failure. Holes in the mother board 60 are shown for passage of the push-pull handles through the mother board. An additional hole 62 is shown which is used for passage of the input fiber optic bundle 44 through the mother board.

Figure 4:
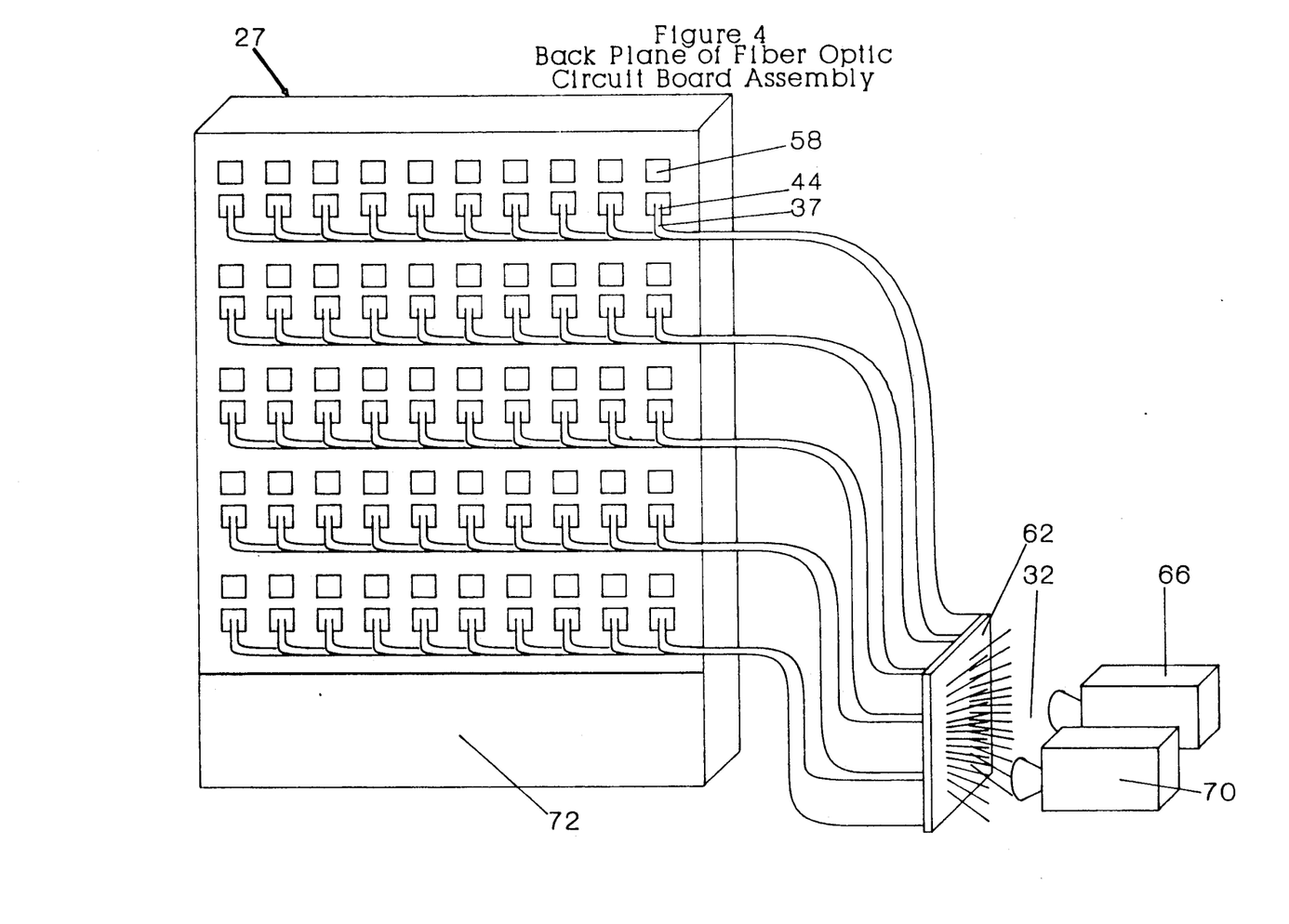
FIG. 4 shows a fiber optic circuit board assembly and how it would be assembled in to a complete display unit.

Once assembled together, an entire array of push-pull handles 58, as well as input fiber optic bundles 44 will be extending from the back of the mother board as shown in FIG. 4. All the bundles are then arranged into a coherent fiber optic face plate 62. The fiber optic coupling 37 shown is typical of which there are many known technologies. A camera (CAM) 66 is then positioned at the correct distance 32 in front of the face plate. If three-dimensional recording/receiving is desired, two cameras (CAM) 66 & (CAM) 70 (or more) can be used, provided they are also positioned correctly. All the necessary computer and video electronics can be housed almost any where such as underneath the assembly 72, or in a separate box that is connected to the display assembly via a cable. This would be done in case a relatively flat display panel is desired as compared to a bulky conventional CRT.

Figure 5:
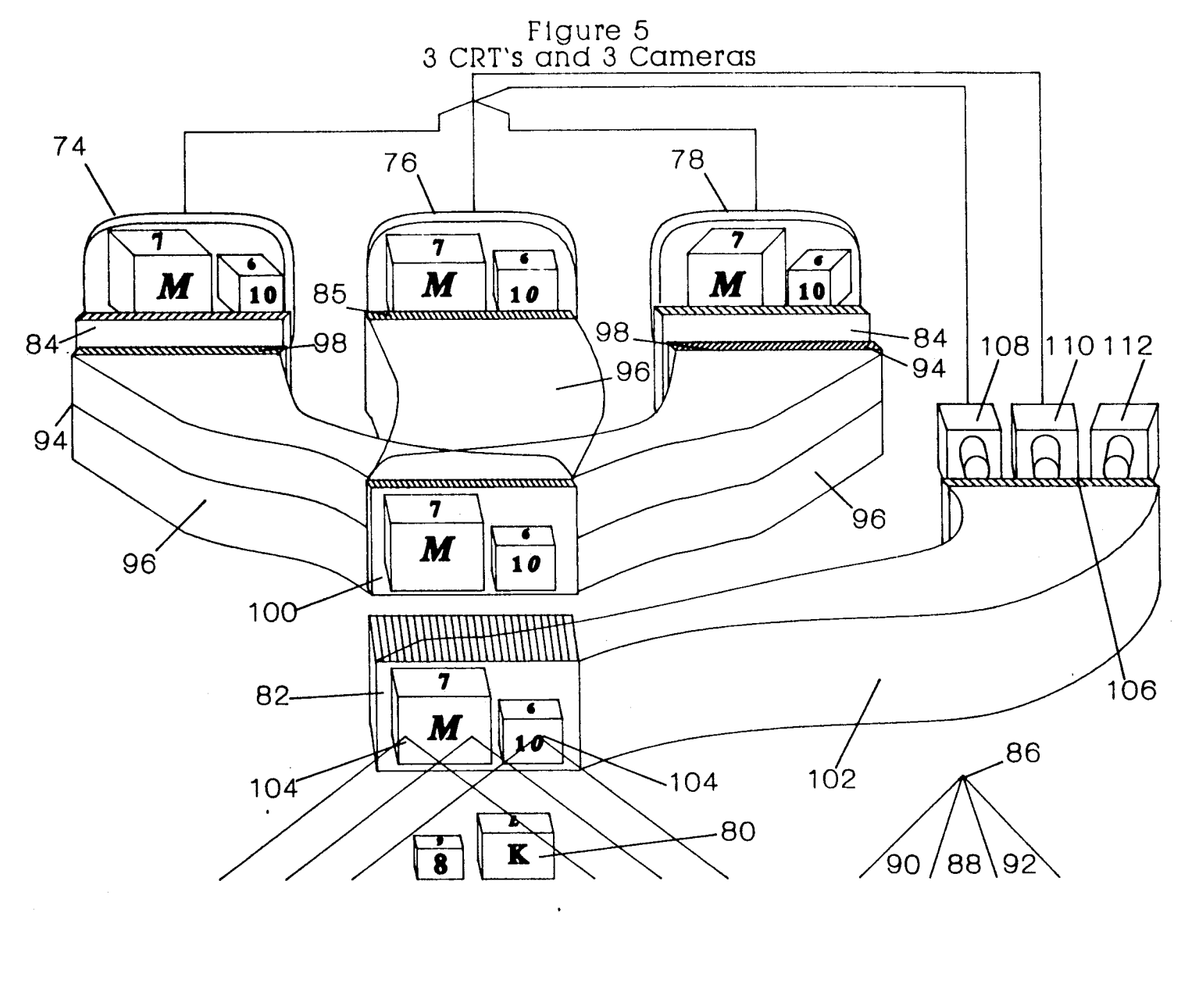
FIG. 5 shows the back of the mother circuit board assembly and how the light receiving device, such as a camera, would be attached.

As mentioned, if a three-dimensional display is desired, there are several ways to do this using input fiber optics in conjunction with the display. There are several known patents which describe three-dimensional displays, several of which use fiber optics such as U.S. Pat. Nos. 4,525,711 to Gery, Jun. 25, 1985, & 4,571,616 to Haisma, Feb. 18, 1986. These patents both use CRT's in conjunction with a fiber optic display yet neither offer input light wave guides such as fiber optics, to receive as well as present images. FIG. 5 illustrates a similar method of displaying three-dimensional imagery that is very similar to known technologies yet it includes input fiber optic wave guides integrated into the primary display.

Shown in FIG. 5 are three secondary display screens, in this case, CRT's 74, 76, and 78 all of which are displaying the same objects 80, (children's toy blocks) that are positioned in front of the primary integrated input/output face plate 82. Positioned directly in front of each respective secondary display screen 74 and 78 is a primary intermediate fiber optic face plate 84 with the necessary function of allowing only light from the display screens 74 and 78 to pass through at a specific angle of dispersion. Standard CRT's have light scattering techniques that allow for a light dispersion of nearly 180 degrees. This invention will segregate the dispersion into the number of segments that equal the number of CRT's and/or differentiated light sources. The primary intermediate face plates 84 are necessary to accomplish this by means of their distance from the secondary display screens 74 and 78 as well as the numerical aperture of the fiber optic wave guides that make up the face plates 84 and the defined critical angle characteristic of the same fiber optics wave guides. Display screen 76 does not necessarily need an intermediate face plate because it is the center display and it's light dispersion segment from the primary face plate 82, as shown in sample output pixel 86, will be the center light dispersion output 88 versus an angled light dispersion output such as shown at 90 & 92. Here, it is important to point out the polarization may be required this invention in some cases as to prevent wave interference in the various methods described.

Placed directly in front of the primary intermediate face plates 84 are the secondary intermediate face plates 94 which consist of a coherent plurality of fiber optic wave guides 96 with the fibers aligned all in an angled fashion 98 yet with their ends positioned in a plane that is parallel with the plane of the primary intermediate fiber optic face plate 84. These same fiber optic wave guides also have a specific numerical aperture and critical angle of entry which will determine the output angles of light dispersion 90 & 92 from the primary integrated input/output face plate 82, which is illustrated by sample pixel 86. This distance between the primary intermediate face plate 84 and the secondary intermediate face plate 94 is also critical for the desired angles of output light dispersion.

All three fiber optic output bundles 96 are then integrated in a coherent plural fashion to the secondary face plate 100 which will then display a three-dimensional image. Here the input receiving fiber optic bundle 102 can also be integrated, or interlaced into the secondary face plate 100, however an easier method of manufacturing would be to do what is shown on the drawing and have a separate primary integrated input/output face plate 82 which will act to transfer the display image from the secondary face plate 100 to the primary integrated input/output face plate 82. Shown on the primary face plate is a sample of the input angles into three sample input pixels 104 which relate to the corresponding output pixels which could be identified on secondary display screens 74, 76 and 78. As shown, the input (receiving) fiber optic bundle 102 is then integrated (interlaced) in a coherent fashion into the primary face plate 82 without disturbing the image transfer from the secondary face plate 100 to the back of the primary face plate 82. At the other end of the input bundle 102 is the input face plate 106 of which the viewed objects 80 are displayed to the cameras as a normal three-dimensional image as with any large size fiber optic arrays which is a known technology and a typical characteristic of fiber optic wave guide face plates with the appropriate numerical aperture and appropriate critical input angle. Shown in front of in input face plate 106 are three light receiving devices 108, 110, & 112, such as auto focus and auto/remote zoom video cameras, that are recording the viewed objects 80. Here, the distance from the face plate to the camera lens plane is critical. The angle of camera viewing is also critical. The detailed electronics and wiring of the cameras and CRT's is not shown because these are all known technologies.

Figure 6:
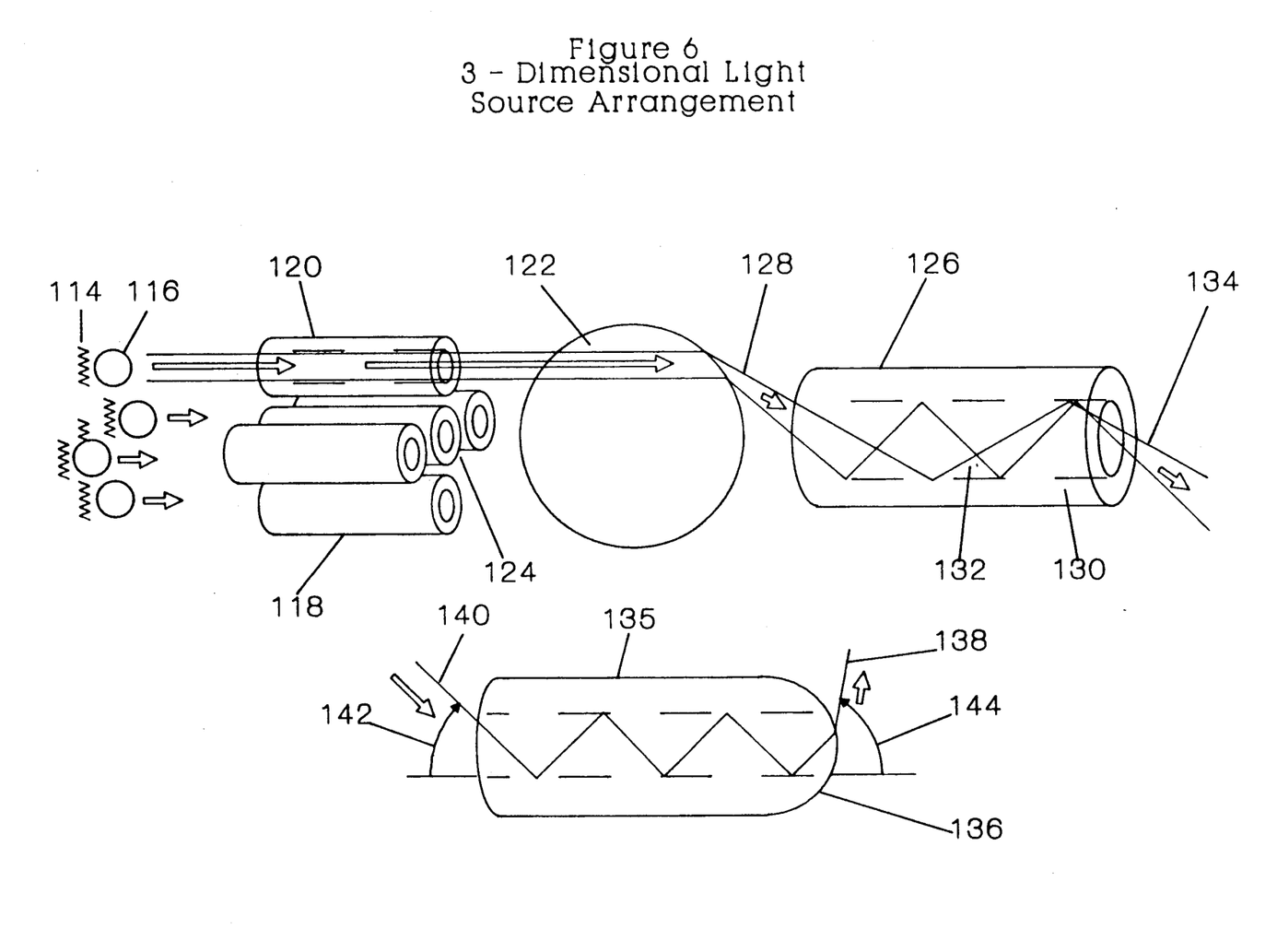
FIG. 6 shows how a system of CRT's similar to FIG. one can be used to present and receive a three-dimensional image.

FIG. 6 is a further extension of FIG. 5 in that it shows an arrangement for a similar three-dimensional display except that instead of using CRT's as image/light sources, it uses individual light sources such as diodes. It is important to point out here that any light source can be used so long as it can be directed for angled light dispersion on the primary output face plate in a fashion shown in FIG. 5, item 82.

Shown in FIG. 6 are the light sources, such as diodes 114, and colimating lenses 116 which is, essentially, the same as a laser diode shown in figure two. Used in conjunction with the diodes is a small bundle of fiber optic wave guides 118, consisting of five wave guide, which are shown, each one receiving light from it's respective light source, the diodes 114. It is important to note here that five light sources with five fiber optic wave guides were chosen here to represent a method of three-dimensional imagery, however, two or more such light sources and wave guides can be used depending on the degree of three-dimensional definition desired. The more light sources and corresponding wave guides used, the more three-dimensional definition is created. Five light sources are preferred in order to represent a three-dimensional image from both a vertical and horizontal point of view. This is another advantage over prior art in that the referenced prior art does not present images with three-dimensional imagery on a vertical plane, instead it presents the three-dimensional imagery on a horizontal plane only. This invention has a technique for accomplishing three-dimensional imagery in both the horizontal and vertical planes. This is shown in FIG. 6, by sample wave guide 120, and output light 134.

Additional light sources, and corresponding additional wave guides in bundle 118 will result in images with three-dimensional imagery on any desired plane. An almost unlimited number of planes can be used. Only the size of the bundle 118, as compared to the rest of the assembly, is the limiting factor. Output light exit angle 134 represents an output zone for the light. FIG. 6 has five output zones because of five wave guides in bundle 118. Almost an unlimited number of output zones can be used. Again, only the size of bundle 118, as compared to the rest of the assembly, is the limiting factor.

Shown in FIG. 6 is the peripheral wave guide 120 and the respective colimated light passing out of it and into a second colimating lens 122. This assembly can be manufactured in a very similar technique used in making a laser diode. Also shown is center wave guide 124 of which non-colimated light is exiting it and entering the colimating lens and thereby exiting the lens in a colimated fashion with a specific angle of dispersion entering the primary wave guide 126 and exiting the same wave guide with the same angle of entry. Specifically shown is the light path of the top peripheral wave guide 120 of which the light exits the wave guide in a colimated fashion, enters the lens 122, and exits the lens in a specific light dispersion angle 128.

The light then travels down the fiber optic wave guide 126, which should be, but is not limited to the stepped index type. The light reflects from side to side down it's length, not exceeding the critical angle of the fiber optic. The critical angle is determined by the refractive index of the core 132 as compared to the cladding 130 as is a known technology. A small amount of light scattering will take place inside the wave guide due to impurities, but essentially, the exit angle 134 of the light will equal the entry angle 128.

If a greater numerical aperture is desired, a fiber end lens 136 can be provided which will increase the angle of exit light 138 as compared to the angle of entry light 140 as shown in angle 142 versus angle 144.

FIG. 6 can be viewed as an extension of FIG. 2 and FIG. 3 if three-dimensional imagery is desired in output fibers making up the face plate display 48.

Figure 7:
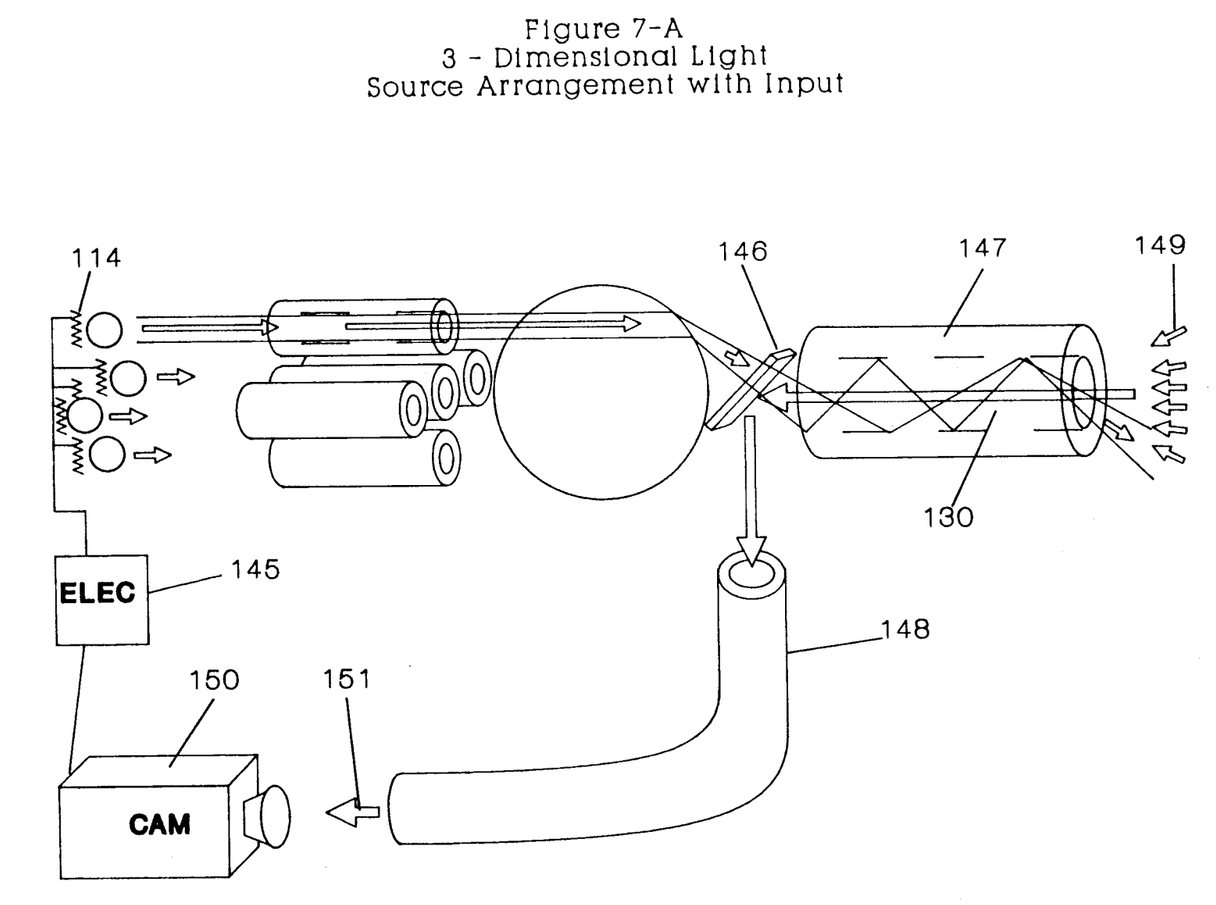

FIG. 7-A shows essentially the same embodiment of FIG. 6 with the exception of using one and the same fiber optic as both the input and the output fiber. Shown as item 146 is a two-way mirror which acts as a coupler and allows light to pass through the back of it while also causing reflection of light i the front of it. The input light is then reflected from the mirror, down into a input fiber optic 148 which in turn exits the input fiber optic 148 and is received by a camera 150 precisely as described in FIG. 4 and FIG. 5. Also, this invention is not limited to a coupler as shown by using a two-way mirror 146, but can also use known prior art fiber optic couplers which are available in abundance, except they are used for purposes other that used for simultaneous image presentation and receiving such as fiber optic communications and the like. Polarization of the light within the multi-input/output (primary) fiber optic 147 can be used to prevent interference. Also, the intensity of one or more light sources, such as diodes 114, may have to be increased to compensate for the intensity reduction caused by the mirror 146 This method will essentially double the resolution of the display and greatly increase the definition to extremely high definition.

FIG. 7-B is an extension of FIG. 7-A. Essentially, FIG. 7-B shows an assembly which directly replaces the camera 150 in FIG. 7-A. The same input fiber optic wave guide 148 is shown with input light traversing its length. The light then exits fiber optic wave guide 148 and enters colimating lens 123. It then enters fiber optic bundle 119, specifically shown is light entering fiber optic wave guide 121 and then being detected by photo diode 115. This system is essentially the same as described in FIG. 6 except the light is traveling in the opposite direction and photo diodes 115 replace the light emitting diodes 114.

In cases where separate input and output fibers are used, the geometrical arrangement of the input and output fibers must be taken into consideration for this invention. One such arrangement is shown, but not limited to, that in FIG. 8. Here a single fiber optic face plate 152 is shown in which a few sample input wave guides 154 are illustrated on one half only and a few sample output wave guides 156 are illustrated on the other half only. Also shown are the crevice 157 associated with the individual module placement as described in FIG. 3. The size of the crevice will vary depending on the manufacturing tolerances achievable, the smallest tolerances the better. It should be noted here that this invention need not be limited to individual modules but that in addition to the described embodiments, that a single-piece, fiber optic, wave guide display of varying sizes can be used instead of individual modules if a single-piece display is desired.

Figure 8:
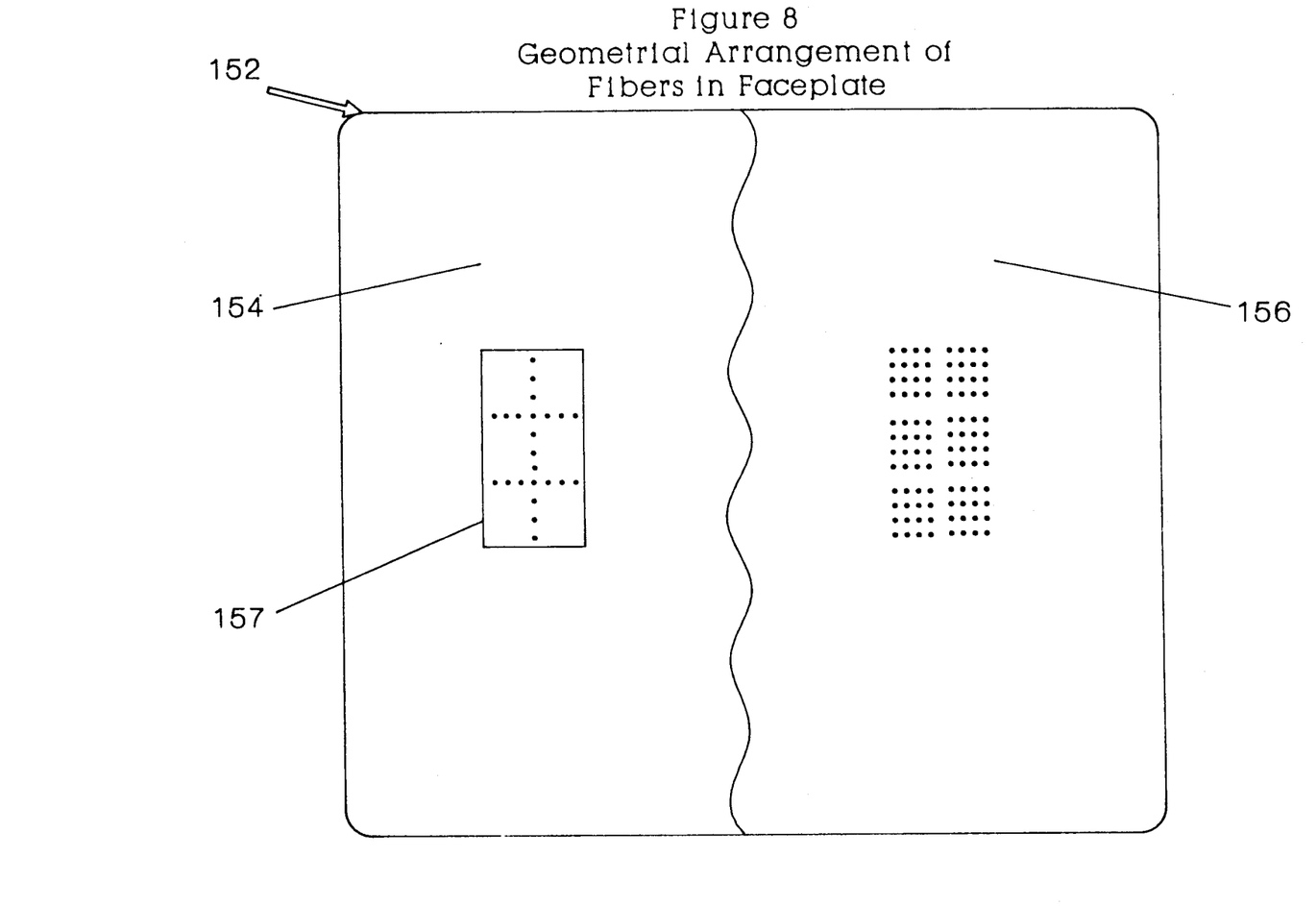
FIG. 8 shows an example of a integrated input/output fiber optic face plate with a geometrical arrangement of the fibers.
Figure 9:
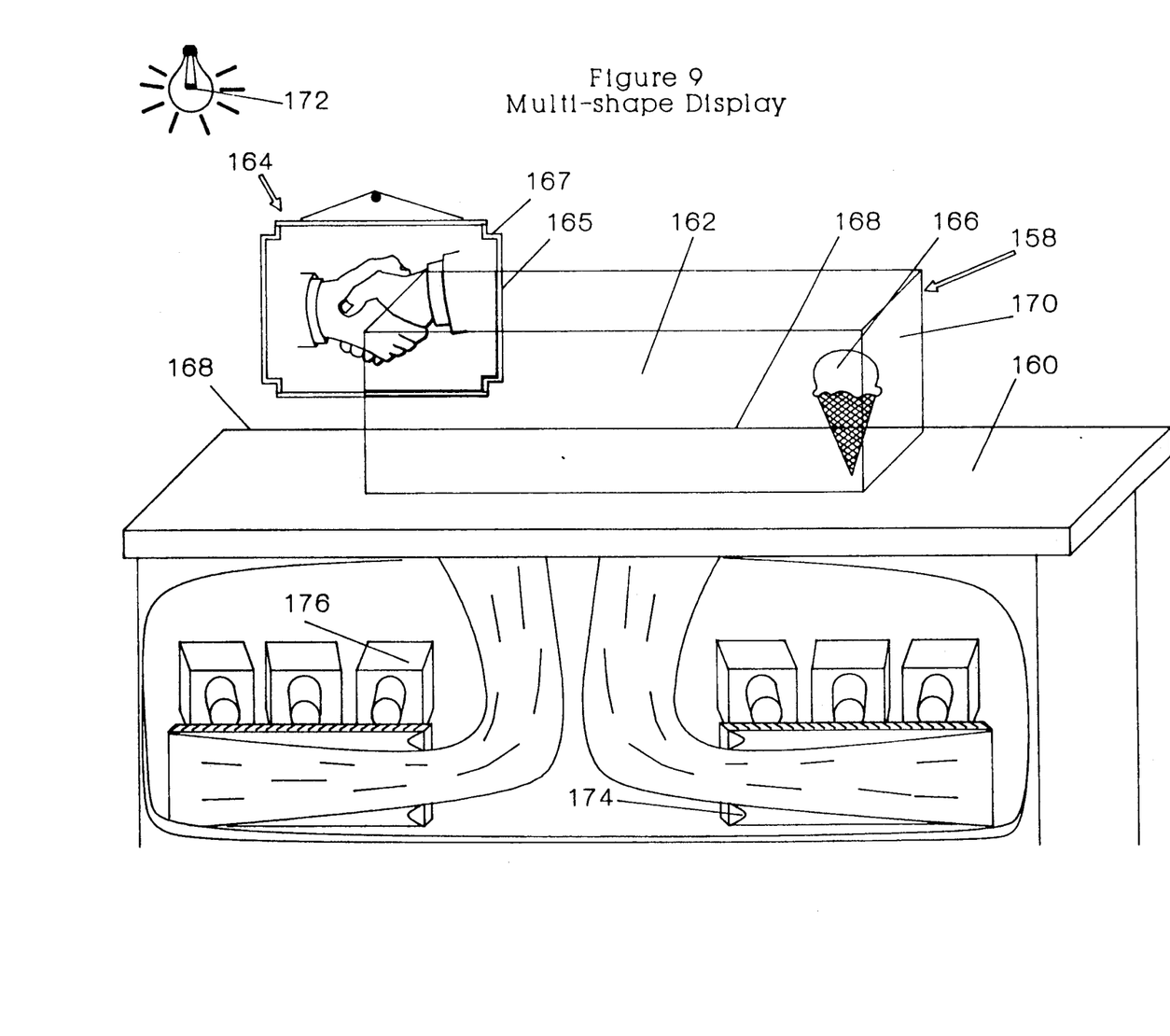
FIG. 9 shows a multi-shape display for presentation of three-dimensional/holographic images and a means of rendering the display transparent to varying degrees.

The same embodiments described in FIG. 3, FIG. 4, FIG. 6, FIG. 7 and FIG. 8 can all be used in varying degrees to produce a multi-shaped display as shown in FIG. 9. Here is illustrated a multi-shaped display such as a rectangular holographic display 158, which is positioned on top of a cabinet or other such enclosure 160.

The rectangular display 158 shown is made up of five sides with each individual side being of a very similar design to the display shown in FIG. 3 and FIG. 4 with some modifications to accommodate the internal spacing requirements of the rectangular display 158. Being shown on the display 158 on side 162 is both a three-dimensional representation of a corner of a wall painting of two shaking hands 164, a portion of an ice cream cone 166 and the far edge of the cabinet top 168. The other portion of the ice cream cone 166 is displayed on side 170. The entire shown display assembly is situated in a room with light bulb 172 emitting ambient light at specific wave lengths, the same wave lengths as is being emitted by the light sources in display 158. The light sources in display 158 can be the same as those mentioned in the description for FIG. 3.

Underneath display 158, contained in cabinet 160 is situated a series of fiber optic input face plates 174 much like the one described in FIGS. 1, 4 and 5. The number of face plates will vary depending on the desired fiber optic pixel density, resolution and definition desired in the display. The number of cameras 176 shown will vary depending on the degree of three-dimensional/holographic effect desired. The wall painting 164 shown is shown as a real object and is placed a distance in back of the rectangular display 158. The edge of the cabinet top 168 is also a real object and can also be shown in the display. This invention is not limited to cameras used as image receiving devices. Photo diodes or other similar known technologies can be used in which individual fiber optic wave guides are addressed which are similar to that shown in FIG. 7-B.

OPERATION OF THE INVENTION

FIG. 1 shows a two-dimensional system in which CRT 14 can display any image desired either from the shown camera 20 or another camera elsewhere. In this configuration, the exit pupil 26 could be viewing itself in the display such as the display will be acting as a real-time electronic mirror in which the exit pupil could be viewing itself, eye-to-eye or another image. Since the pixel density of a fiber optic display can far exceed the pixel density of conventional CRT's this invention can easily display the image of the exit pupil on display screen 10 with the same resolution and definition as it is shown in CRT 14. One may think that the input pixels that make up a proportion of input/output display screen 10 would reduce the display's output resolution. This is not the case because the number of fibers in the fiber optic array 16 can easily equal or exceed the pixel resolution of the CRT 14, thereby allowing for equal resolution of the CRT 14. Also, since a light scattering technique can be used as shown in FIG. 2, the scattered output pixel light will over shadow the input pixels, although not to the degree that back scattering occurs and impairs the input light. In most cases, a light scattering material 12 should not be needed because of the scattering provided at by the CRT 14 into the fiber optic output array 16. Here the distance between the two is important. The smaller the distance 24 the more peripheral light is picked up by the array 16. Here it is preferred, but not limited to, the use of fiber optic wave guides with a large numeric aperture, such as the multimode type of fiber optic. The distance 22 between the fiber optic input array 18 and the auto-focus, auto-/remote zoom video camera 20, or another type of image receiving system, is also important so as not to distort the two-dimensional pickup of the viewed image into a warped pseudo three-dimensional image by picking up peripheral light. A distance 22 should be maximized and then zoomed in on for the correct image transfer.

The operation of FIG. 2 is not limited to the specific light scattering technique shown. U.S. Pat. No. 3,907,403 to Matsushita, Sep. 23, 1975, shows another light scattering technique that could be used, however, since many different light scattering techniques are well known they are therefore not discussed in this invention, with the exception of the technique shown in FIG. 2. FIG. 2 shows a substrate material with a homogeneous mixture of irregularly shaped particles at a designated concentration imbedded within the substrate. The particles provide elastic reflections of the light without back scattering which will could cause interference to the input light used for image receiving.

The operation of FIG. 2 is essentially a cumulation of known art and is necessary for the operation of one design of this invention. The light source, shown as a laser diode 32, is monochrome. It should be noted that the light source for this invention need not be limited to a laser diode. Any light source be it monochrome or color or a series of color light sources can be used from varying technologies such as gas plasma, deforming mirror and the like. Any of these sources can be used in the operation of this invention.

These different light sources can be arranged on circuit boards or the like as shown in FIG. 3. Here is shown the operation of a single fiber optic circuit board 38 referred to as a module. The module shown need not be limited to a single circuit board but could also use stacked circuit boards. The number of light sources used can vary depending on their physical size and the total apparatus depth desired and the pixel density/definition desired. In FIG. 3 are shown numerous light sources 40, all of which are interfaced with integrated circuit 46. The technique of computer controlling an array of light sources to display an image is a well know art and therefore that operation will not be included in this invention. The pertinent operational points of FIG. 3 are that the output fibers are emitting light which is a known art, however interlaced with the output fibers are input fibers which are receiving light in front of the display. Since the pixel resolution of the fiber optic array can be much higher than non-fiber optic technologies, such a plasma gas, deforming mirror, CRT's and the like, the presence of input fibers will not be noticed by the viewer from a distance. It should be noted here in FIG. 3 that the input fibers can be one and the same as the output fibers as shown in FIG. 7-A and FIG. 7-B. Also, the size, diameter and length of the input fiber can be different from that of the output fiber. In addition to other parameters, the microprocessor 46 is also aware of other characteristics of the circuit board which can include, but not necessarily, the length of each fiber optic pigtail, in order to maintain all inputs in phase with each other.

Shown in FIG. 4 are cameras 66 and 70 which can vary position depending on the size of the fiber optic input array 62, the numerical aperture of the input fibers and the critical angle of the input fibers. Here it important to note that for the operation of this invention, the type of fibers used need not be limited to multimode, stepped index, but in some instances, single mode and other types of light guides can be used as well. A single camera 66 can be used to receive and record the entire input array if two-dimensional image receiving is desired. This is probably the largest potential use of this invention, however if a three- dimensional image receiving/recording is desired, additional cameras 70 can be positioned at an angle to the image on input array 62. Angling cameras at images for three-dimensional displaying is a known art, the difference with this invention is that the angle of camera view is done at the fiber optic input array 62 in which it has the appropriate numerical aperture and appropriate critical angle to provide the peripheral cameras such as 70 with the correct angled light in order to obtain multi-angled views such as side and/or top and bottom views of the object being viewed. Two or more cameras can be used for three-dimensional representation or two or more light receiving devices can be used for each fiber optic wave guide input.

FIG. 5 shows a simpler version of this invention in which a three-dimensional effect can both be received and displayed using conventional cathode ray tubes as light sources and conventional video cameras as image receiving means. Here, the operation of FIG. 5 is illustrated by using two objects 80, which in this case are two wooden children's toy blocks of different sizes, each with different letters and numbers on their respective sides. The objects are positioned in front of the integrated input/output faceplate 82. In this particular case, the input and the output fiber optic wave guides are interlaced together on the faceplate 82 on a one-to-one basis, however this invention need not be limited to a one-to-one relationship but may instead be of varying proportional ratios with each other. The geometrical arrangement in the fiber optic wave guides in the primary face plate of input versus output is again, every other fiber, however this invention need not be restricted to this geometrical arrangement. The faceplate 82 shows the output fibers only being a few centimeters in length where as the input fibers are much longer which is necessary for the separation of the two different functions of the input and output fibers. As shown in FIG. 5, the cameras 108, 110 and 112 are viewing the objects 80 on the input faceplate from three different angles (just as was described for FIG. 4) via the input fiber optic bundle 102

Through known techniques, the video inputs of cameras 108, 110 & 112 are then displayed on CRT's 74, 76 & 78 respectively. As shown, the viewed objects 80 are displayed on the left side of CRT 74, the center of CRT 76 and the right of CRT 78, which is to be expected of three respective cameras being used. This illustrates a three angled horizontal viewing of an object for a three-dimensional representation of the same object. If more three-dimensional clarity and representation is desired, then additional CRT's cameras and fiber optic arrays in various vertical and horizontal arrangements can be used. This invention is not limited to only three cameras and three CRT's.

Situated in front of each CRT 74, 76 and 78 is a fiber optic face plate. The purpose of face plates 84 which are in front of displays 74 and 78 are to align the light properly such that light entering face plates 84 from displays 74 and 78 will be the correct angle. From this, all peripheral light coming from the display 74 and 78 will be eliminated because it will exceed the critical angle of the fiber optics used in face plates 84 which in turn have a predetermined angle of aperture, refractive index and critical angle. A predetermined angle of aperture, refractive index and critical angle must be specific in order to establish the desired angle of exit of each respective image at primary faceplate 82 pixel output as shown at the sample pixel 86.

As light exits the displays 74 and 78, it enters face plates 84 at a specific angle, not exceeding the critical angle of the fibers making up the face plates 84. The light then exits the face plates 84 and enters a secondary intermediate face plates 94. This operation has then just eliminated all light entering face plates 94 which exceeded the critical angle of face plates 84. As shown, the fiber optics in face plates 94 are all set in a plural arrangement that are at an angle, not perpendicular, to the face plates 84. This is done so that the only light entering the faceplates 94 is at an angle, not parallel to the fiber optics making up face plates 94. By doing this, the exit light from secondary face plate 100 will be at an angle only, not parallel to the fiber optic, as illustrated again by a sample pixel 86 in which the view from display 74 is shown as 90 and a view from display from 78 is shown as 92 and the view from the display 76 is shown as 88.

A secondary face plate is not necessary for display 76 because it will exit the secondary face plate 100 at an angle that is approximately parallel to the fibers of the face plate 85 immediately in front of display 76. This exit angle is again illustrated by the sample pixel 86 in which the view exiting the pixel from center CRT 76 is shown as 88.

All three CRT images are then accumulated on secondary intermediate face plate 100 in which the three different views exit each and every pixel on the face plate 100 (except for the input fiber "pixels") at different angles as shown by sample pixel 86. Here on face plate 100 is a three-dimensional output display only. Primary face plate 82 is then placed in front of face plate 100 and the three-dimensional image is then transferred to the front of primary face plate 82 which also has input fibers interlaced within it. The purpose of face plate 82 is to easily illustrate input and output fibers together on the same display, however face plate 82 could be eliminated and the input fiber optic bundle could be integrated/interlaced in with face plate 100 to accomplish the same task. If face plate 82 is used in conjunction with face plate 100, the distance between the two should depend on the cross sectional area of both, and the distance between the two should be as small as possible, such as less than an a few centimeters. Distances between faceplates 84 and 94 should also depend on the cross sectional area of the two as well as the numerical aperture, the critical angle and refractive index used in the fiber optic wave guides that make up each face plate. These same conditions exist between the face plates 84 and their respective CRT displays 74, 76 and 78.

It should be noted that if the objects 80, were replaced by a human being, a woman, or man would be essentially viewing himself, eye-to-eye, electronically, with three-dimensional imagery. This system can be modified by use of a single mirror placed at input face plate 106 if a mirror-image presentation was desired on face plate 82. If the video signals between the cameras 108, 110 and 112, and the CRT's 74, 76, and 78, were digitized, a computer could implement a variety of special effects that are described earlier in the Objects and Advantages section. As the exit pupil of the woman, or man scanned back and forth across the screen, she would view differentiation between her/his two exit pupils. This technique is nearly identical to that shown in U.S. Pat. No. 4,571,616 except that no lenses are used in my invention, rather fiber optics are entirely used. Since the optical effect of angled output is described in prior art, it need not be re-explained here, only the primary difference be emphasized that my invention offers image input, as well as output on the same primary face plate.

FIG. 6 operates in a manner such that the light being emitted by a diode 114 (or any other such light source) is colimated by lens 116. The light then travels down fiber optic 120, which can be of any length or material or diameter. The purpose of having fiber optic 120 is so that other fiber optic strands in the bundle 118 can be bunched together in order to all address colimating lens 122. Once the light from each respective fiber optic in the bundle 118 enters lens 122, it then exits lens 122 at specific angles such as 128. These angles will define the magnitude of the three-dimensional effect, as will the number of fiber optics in bundle 118. The number of wave guides in bundle 118 is limited only by the size of the bundle 118 as compared to the rest of the assembly. Once the light exits lens 122, it then enters fiber optic 126. The light will then traverse the length of fiber optic 126. Again, the length and diameter of fiber optic 126 can vary. The exit angle of the output light 134 is the same as the entrance angle 128. Output light 134 is exiting wave guide 126 at a specific angle, which is defined as a specific zone. The number of zones is dependant on the number of wave guides in bundle 118. The number of wave guides in 118 can be much greater than the shown five. Because of this the number of output zones can be much greater than five as well. Each individual zone of output light can contain different views of the same image. This would be for use of presenting three-dimensional images and the like. Each zone could also contain totally different images. Clearly, if the length of the fiber optic 126 is not correct, the exit direction of the output light 134 can vary. This is where the operation of this invention depends on the characterization of different fiber optic lengths. This characterization is performed by a microprocessor, such as that in FIG. 3, item 46. This characterization is a simple procedure and can be performed by a corresponding test fixture which characterizes the input light to it's specific output angle via the microprocessor 46.

Also shown in FIG. 6 is a fiber optic wave guide 135 with an end lens 136. What this end lens does is to increase the angled output of light as compared to the input angle. This is illustrated by entrance angle 140 which is much less than exit angle 144. The advantage of this increase in exit angle is to improve the dispersion angle of light, thereby increasing the viewing angle of the three-dimensional effect. This function is important for the operation of FIG. 9.

FIG. 7-A operates essentially the same as FIG. 6 except that it includes a two-way mirror 146. The input light from a object is illustrated by input arrows 149. The input light enters fiber optic 147 and traverses its length. It then exits fiber optic 147 and is partially reflected into fiber optic 148. The light then traverses the length of fiber optic 148 until it exits at point 151. Also, this invention is not limited to a coupler as shown by using a two-way mirror 146, but can also use prior art fiber optic couplers which are used for purposes other that used for simultaneous image presentation and receiving such as in fiber optic communications and the like. It should be noted that all mentioned fiber optics can be of varying sizes and lengths. Further it should be noted that all fiber optic strands can be arranged in a bundle or bundles. This could be the case with fiber optic 148 at point 151. Here, at point 151, could be an entire array of fiber optic exit points for camera 150 to view. The image that camera 150 is viewing could be digitized by known electronics, such as at 145. The same electronics could then send the image to diodes 144, thereby transferring the view image to an exit array made up of fiber optics such as 130. This operation would create a true electronic mirror with true eye-to-eye viewing. The image could also be sent elsewhere, or a combination of both. Two or more cameras can be used for three-dimensional image receiving, recording and representation. Also, shown camera 150 can be substituted by other light receiving devices such as, but not limited to, photo diodes as shown in FIG. 7-B. Here the operation of the light receiving system is such that each light receiver, such as the photo diodes 115, are electronically receiving the image on a three-dimensional basis.

It should be noted that images other than that being viewed by the input array can be displayed. This process would be for use such as viewing another person for video conferencing, telepromting and the like.

FIG. 8 is an example of the geometric arrangement of the fiber optic strands on a face plate which uses separate input and output fiber optic wave guides. The successful operation of the invention is dependent on the arrangement of the individual fiber optic wave guides in that any irregularity in the display will be unfavorable to the viewer. However, because of the extremely high pixel density, any slight irregularities will be unnoticed, such as placement of input fibers 154 integrated in with output fibers 156 and the associated crevices 157 of individual modules. Many different geometrical arrangements can be used and are not limited to that shown in FIG. 8. If the design in FIG. 7-A and FIG. 7-B are used, then the geometrical arrangement of input and output fibers are not an issue.

FIG. 9 operates in much the same manner as previously described. FIG. 9 shows a multi-shape display.

This multi-shape display need not limited to a four-sided rectangular display, but can consist of one or more sides of varying geometrical shapes which include, but are not limited to rectangles, squares, pyramids, spheres, hemispheres and the like. It is necessary for a computer driving the output light to have the precise position of the display sides as data in order for it to provide the correct output light at the correct output angles into the correct output zones. It should also be pointed out that that this multi-shape display which is not limited in its shape, can also be a moving display in which position indicators or transducers which are a known art, can provide input data to the computer and provide it with dynamic, live data on to the position of the various displays, their shape, speed of movement and other parameters necessary for the computer software to calculate the correct output light at the correct output angles into the correct output zones. FIG. 9 is only one example of a multi-shape display with input/output image capability.

FIG. 9 operates by means described in FIGS. 3, 4, 6, 7-A and 7-B. Essentially, five such flat displays are joined together to form a rectangular display box 158, which has no bottom side display. Shown behind display 158 is a real object, a wall painting 164. The display 158 appears to be transparent in that the wall painting 164 can be seen through the display 158. This is because input fiber optics on the opposite side of display 158 (not shown) are viewing the wall painting 164 in the same manner in which input viewing (i.e. input light) is described in FIGS. 3, 4, 6 and 7. The image of the painting 164 is digitized via a series of hidden cameras 176 and a computer (not shown) by known technologies, or other image receiving devices, such as that described for FIG. 7-B. The image is then displayed on display side 162 using a technique, but not limited to the technique in FIG. 6 and FIG. 7-A in which multiple dimensions of angled light is exiting each individual fiber optic wave guide. Five dimensions are shown in FIG. 6 and FIG. 7-A by means of fiber optic bundle 118. Additional dimensions (additional fiber optics in bundle 118) are used in FIG. 9 in order for a satisfactory degree of definition to be obtained in display 158. Even if a high number of dimensions are used, there would still be a blurring of the image display of painting 164 as shown by the painting's frame 165 versus 167.

It should be pointed out here that the painting 164 can be seen through the display 158 from all angles, no matter where in space a person is viewing the display from, provided the painting 164 is situated behind the display 158.

Also shown is the cabinet edge 168, a real object, which is also seen through the display. The cabinet edge is displayed in the exact same manner as described for the wall painting 164.

Also shown is an ice cream cone 166. The ice cream cone is not a real object, rather it is displayed within the display 158 as a computer generated three-dimensional/holographic/stereoscopic image. The ice cream cone is displayed in the same manner as described in FIGS. 3, 4, 6 and 7-A, except with a higher degree of definition and a greater number of dimensions just as described for the image of the wall painting 165.

Purposely not shown in FIG. 9 are the hidden lines for the isometric view of the back side of rectangular display 158. This is because a reader of this patent may think the lines should appear because the display 158 is essentially transparent. This is not the case. The lines are missing or order to not confuse the reader. The lines would not appear and are therefore not shown in any fashion in order to point out the fact that the lines would not appear at all.

I claim:

1. Display panel for simultaneous, not alternative, image presentation and receiving comprising:
    a plurality of optical light guide means for propagating input and output light through and along a longitudinal axis with said output light exiting said display to be presented as an image and for said input light entering said display to be presented as an image received for displaying on same said display or displayed elsewhere or to be recorded or any combination there of;
    light emitter means provided at one end of said number of optical light guides which are opposite of said display, for providing said output light to that end of said number of optical light guide means representing the image to be presented;
    light receiver means provided at one end of said number of optical light guides which are opposite of said display for providing said input light to that end of said number of optical light guide means representing the image to be simultaneously displayed on said display or displayed elsewhere or to be recorded or any combination there of.

2. Display panel according to claim 1 where in said optical light guide means is adapted to simultaneously, not alternatively, receive and display images by using a separate receiving input optical light guide means and a separate presentation output optical light guide means, all of which are integrated together in said display panel.

3. Display panel according to claim 1 where in said optical light guide means is adapted to simultaneously not alternatively, receive and display images by means of each individual said optical light guide receiving input light and presenting output light, into and from said display panel simultaneously.

4. Display panel for simultaneously, not alternatively, presenting a plurality of images and receiving an image comprising:
    a plurality of optical light guide means with one end of said optical light guide set perpendicular, or about perpendicular to a face of said display panel;
    a plurality of light sources entering one end of each individual said optical light guide located outside of said display means at angles such that two or more separate said images or two or more views of a single image will exit the other end of said optical wave guide which is located within the display;
    a plurality of light receiver means provided at the end of said number of optical light guides located outside of said display means for providing said input light to that end of said plurality of optical light guide means which will act to represent the input image to be displayed on said display or displayed elsewhere, or recorded or any combination there of.

5. Display panel according to claim 4 where in said optical light guide means is adapted to simultaneously, not alternatively, receive and display images by using a separate receiving input optical light guide means and a separate presentation output optical light guide means, all of which are integrated together in said display panel.

6. Display according to claim 4 where in a plurality of fiber optic wave guides is arranged in a bundle such that light emitting from said bundle will enter another single fiber optic wave guide at various angles and thereby exit the other end of said single fiber optic various wave guide at various angles.

7. Display panel according to claim 4 where in said optical light guide means is adapted to simultaneously, not alternatively, receive and display images by means of each individual said optical light guide receiving input light and presenting output light, into and from said display panel simultaneously.

8. Multi-shape display for simultaneously, not alternatively, presenting a plurality of images or a plurality of views of one or more objects and receiving a plurality of images or a plurality of views of one or more objects, encompassing a plurality of directions in front of said multi-shape display surfaces whereby holographic or three-dimensional images can be presented in said display and said display can be rendered transparent to varying degrees, comprising:
    a plurality of optical light guide means with one end of said optical light guide set perpendicular, or about perpendicular to a face of said display panel;
    a plurality of light sources entering the one of each individual said optical light guide at angles such that two or more separate said images or two or more said views of same said object will exit the other end of said optical wave guide;
    a plurality of light receiver means provided at the end of said number of optical light guides located outside of said display means for providing said input light to that end of said plurality of optical light guide means which will act to represent the input image to be displayed on said display or displayed elsewhere, or recorded or any combination thereof.

9. Display according to claim 8 where in said optical light guide means is adapted to simultaneously, not alternatively, receive and display images by using a separate receiving input optical light guide means and a separate presentation output optical light guide means, all of which are integrated together in said display panel.

10. Display according to claim 8 where in said optical light guide means is adapted to simultaneously, not alternatively, receive and display images by means of each individual said optical light guide receiving input light and presenting output light, into and from said display panel simultaneously.

11. Display according to claim 8 where in a plurality of fiber optic wave guides set in a bundle such that light emitting from said bundle will enter another single fiber optic wave guide at various angles, with the use of a colimating lens or the like, and thereby exit the other end of said single fiber optic wave guide at various angles.

12. Display according to claim 8 where the shape of said display can be any geometrical shape, such as spheres, squares, pyramids, multi-shape and the like, with sides that are stationary or with said sides that are moving in relation to another said side.

13. Display according to claim 8 where said multi-shape display does not have any said light receiving means and is used for said presentation purposes with said presentation means.

* * * * *